United States Patent [19]

Green

[11] 4,320,969

[45] Mar. 23, 1982

[54] METHOD AND ASSEMBLY FOR MEASURING EQUIVALENT SPHERE ILLUMINATION IN THE FIELD

[75] Inventor: John D. Green, Newark, Ohio

[73] Assignee: Manville Service Corporation, Denver, Colo.

[21] Appl. No.: 75,781

[22] Filed: Sep. 17, 1979

[51] Int. Cl.³ .......................................... G01J 356/221
[52] U.S. Cl. .................................................. 356/221
[58] Field of Search ................ 356/213, 218, 221, 229

[56] References Cited

U.S. PATENT DOCUMENTS 3,912,399  10/1975  Griffith et al. ..................... 356/229
4,055,383  10/1977  Zeller et al. ....................... 356/229

FOREIGN PATENT DOCUMENTS 1356251  6/1974  United Kingdom ................ 356/221

OTHER PUBLICATIONS

RQQ Report No. 4—"A Method of Evaluating the Visual Effectiveness of Lighting Systems," R. T. Dorsey et al., Illuminating Engineering, Aug. 1970, pp. 504-513.
"An Instrument for the Measurement of Equivalent Sphere Illumination," Dilaura, D. L. et al., Journal of IES, Apr. 1978, pp. 183-189.
RQQ Report No. 5—"The Predetermination of Contrast Rendition Factors for the Calculation of Equivalent Sphere Illumination," I. Lewin et al., Journal of IES, Jan. 1973, pp. 150-156.
Sastri, V. D. et al., "A Sky-Scanning Photometer for the Luminance Distribution of Sky," Pure and Applied Geophysics, vol. 113, No. 3, pp. 375-387.

Primary Examiner—John K. Corbin
Assistant Examiner—Bruce Y. Arnold
Attorney, Agent, or Firm—Robert M. Krone; Joseph J. Kelly; Gregory W. O'Connor

[57] ABSTRACT

The present invention relates to systems for assessing the quality of illumination provided by a lighting environment to a task location in terms of the ability of that illumination to render the contrast of a visual task at the task location. Past systems have been inaccurate, inflexible, or required trained personnel and bulky equipment to make such an assessment. The present system accomplishes this assessment by generating a series of electrical signals, each such signal corresponding to the luminous flux impinging at the task location provided by a discrete, substantially non-overlapping zone of the lighting environment. These signals, when associated with the position of the corresponding zones, accurately describe the flux distribution of the lighting environment, and are used to calculate Equivalent Sphere Illumination, a figure of merit for that lighting environment.

16 Claims, 5 Drawing Figures

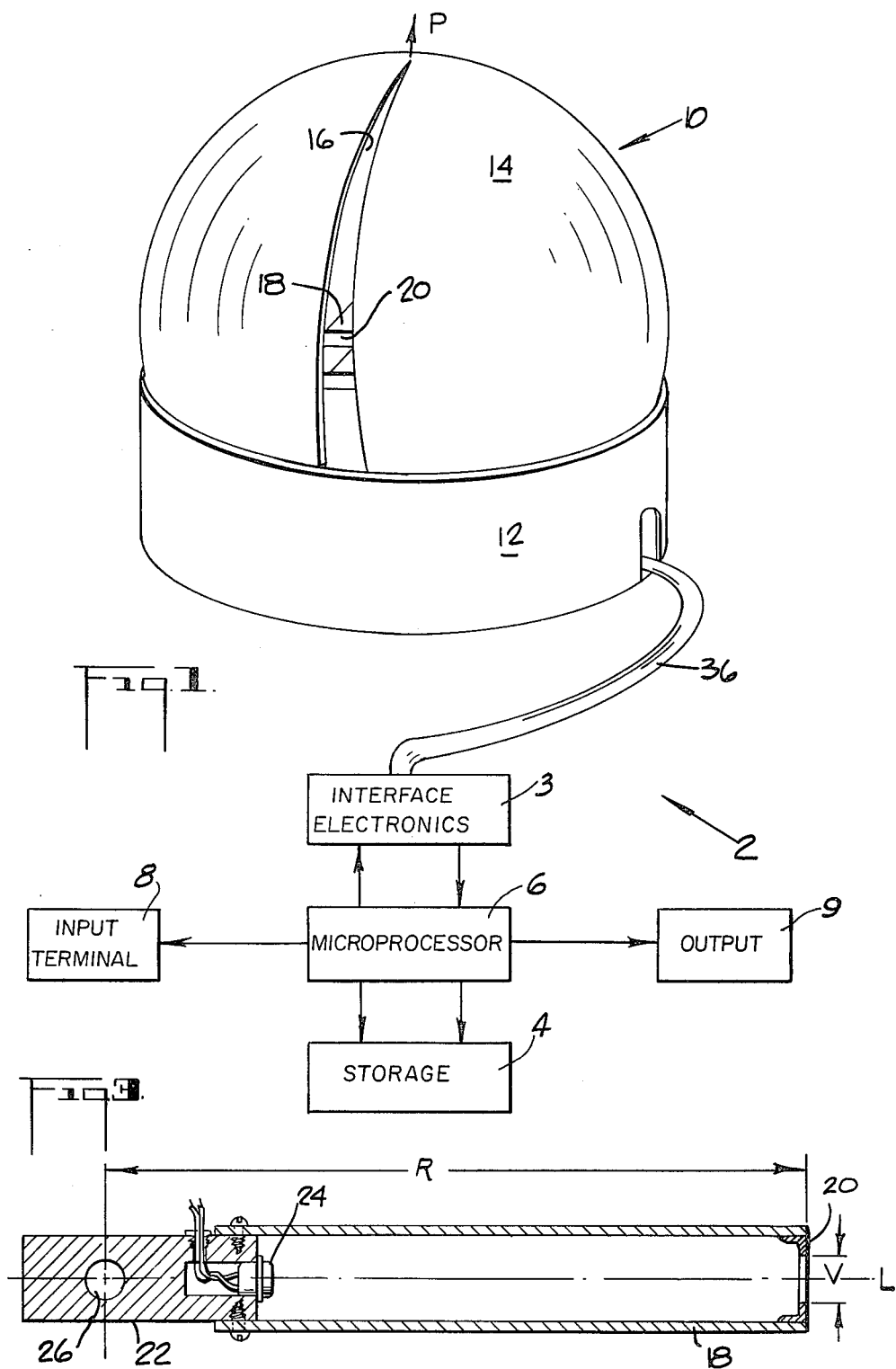

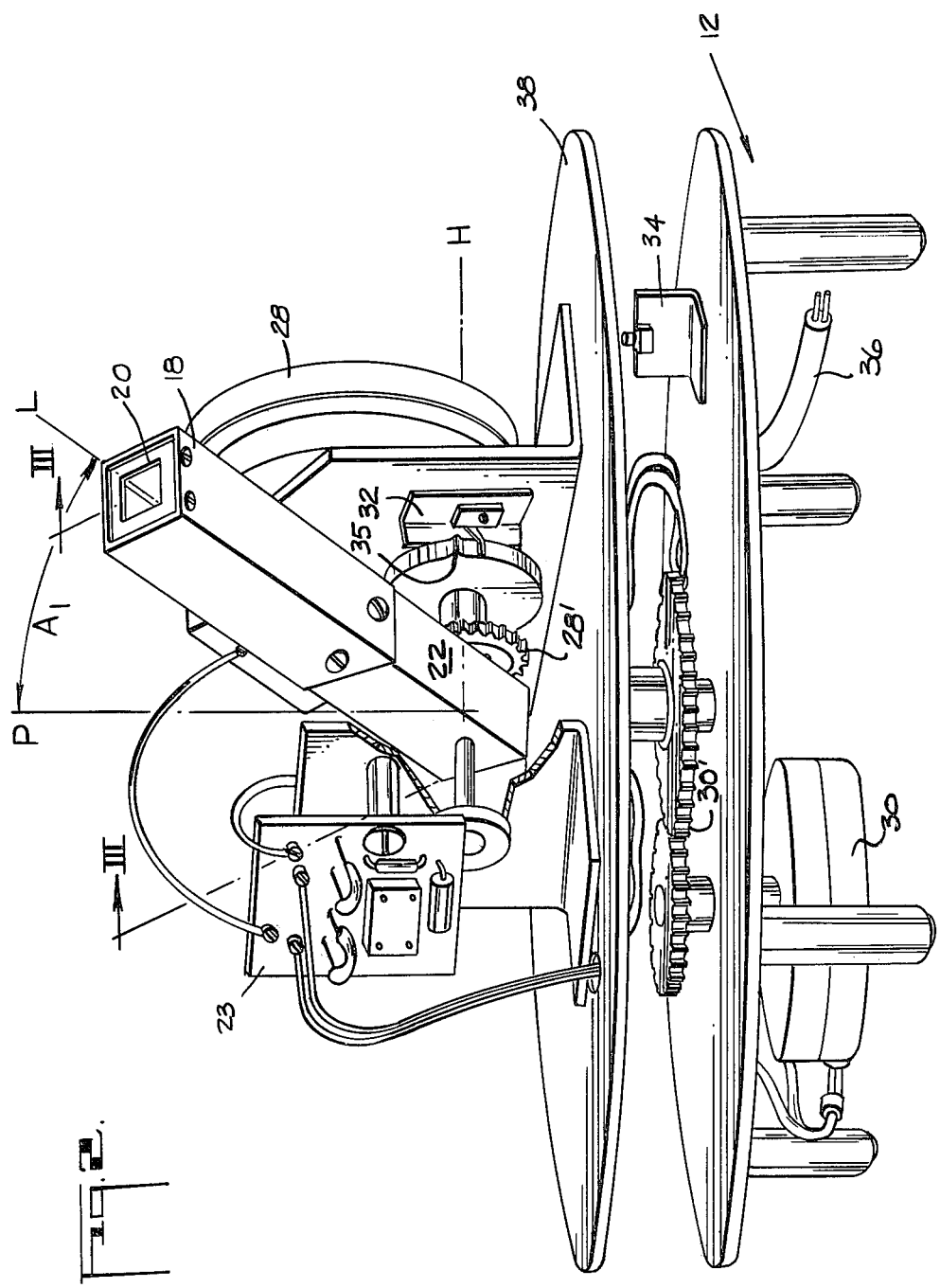

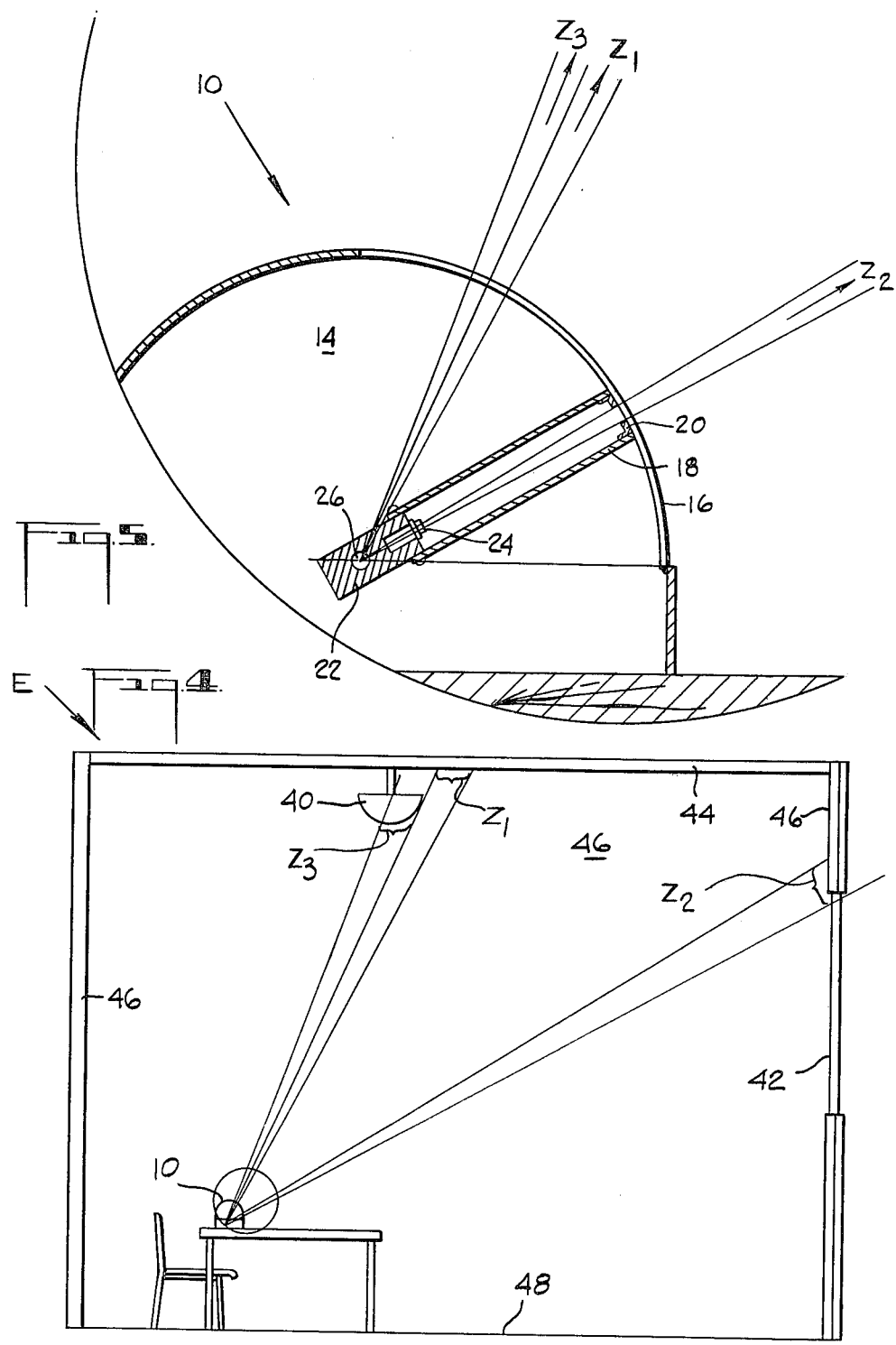

METHOD AND ASSEMBLY FOR MEASURING EQUIVALENT SPHERE ILLUMINATION IN THE FIELD

TECHNICAL FIELD

The present invention relates to techniques for comparing the ability of actual lighting environments to render contrast to a subject, referred to generally as the visual task, to the contrast rendering ability of a reference illumination. This reference illumination is usually sphere or lambertian illumination. Such comparison is desirable in the field of lighting engineering and design since it can give a lighting engineer an accurate evaluation of the efficiency with which the light is being distributed by the actual lighting environment as well as an accurate assessment of the quality of light provided by the lighting environment.

The ability of a lighting environment to render contrast of the visual task is affected by a number of things, among which are direct glare and reflected glare. Both types of glare can reduce the ability of the subject to see details as well as affect the comfort of the subject in viewing such details under these conditions. These two phenomena, while serious, can be easily detected and hence dealt with. Less obvious, and thus potentially more damaging to seeing ability, is the tendency for the image of a large luminous area, such as from a large luminaire or brightly lit wall, to be reflected by the surface of a book or magazine printed on dull or mat paper. This reflection may be undetectable to the naked eye but acts much the same way as viewing the scene through a veil or fine cheese cloth since it tends to reduce the contrast between the task, such as the printing, and the background, in this case the paper on which the printing is positioned. Hence, this phenomenon is termed "veiling reflection".

Many factors aggravate or minimize the contrast losses due to veiling reflections, among which factors are the nature of the visual task (i.e., whether it is printing or handwriting on paper or some other visual task, such as scribe marks on a piece of polished metal), the worker's orientation and viewing angle, and the various sources of direct light, such as the lighting system, and reflected light such as a reflecting wall. These various sources of light make up the lighting environment around the task.

The extent to which veiling reflections reduce contrast determines in part the overall quality of the light provided by the lighting environment. When compared to the intensity of spherical illumination which would provide the corresponding contrast rendering ability, the quality of light can be expressed in terms of an "Equivalent Sphere Illumination" (ESI).

Briefly stated, ESI is that illumination (measured in footcandles) provided by a uniformly illuminated white hemisphere surrounding the visual task which provides the same degree of task visibility as that provided by the lighting environment in question.

BACKGROUND OF THE PRIOR ART

There are several methods for evaluating existing lighting environments as well as methods for predicting the illuminating effectiveness of unrealized lighting environments. Most such techniques currently utilize the concept of Equivalent Sphere Illumination (ESI).

One indirect method involves a number of measurements and calculations and employs the use of a standard visual task such as a hand written pencil lettering on a white paper background. The illumination on the task provided by the lighting environment is measured. The luminance of the visual task is measured from a position which substantially corresponds to the position of the observer in the act of reading the visual task by using a nonpolarizing luminance meter.

Then, using a visual task photometer, the actual contrast of the visual task is measured from the normal eye position as defined above. The visual task is then moved to a position where it is illuminated by sphere illumination and the visual task photometer is used to measure the contrast under these conditions. Then the two measured contrasts are compared. This comparison usually entails a series of calculations and reference to a number of standardized, tabulated data to correct for any difference between the luminances under the two lighting conditions. The final comparison is usually expressed in terms of Equivalent Sphere Illumination.

This method is outlined in detail in RQQ Report #4, Illuminating Engineering, Volume 65, August 1970, Pages 504–510.

To date the only way to directly measure ESI for a particular lighting environment is with a prior art meter which involves subjective visual judgment by a trained operator. This method, as outlined in U.S. Pat. Nos. 3,912,399 and 4,055,383, uses a visual observation in order to compare directly the visibility of a standard task rendered by the lighting environment in question with the same or identical reference task illuminated by a sphere illumination. The visibility of the reference task positioned in the lighting environment is reduced to threshhold by degrading the contrast between the background and the task itself. This is done by utilizing a graduated neutral density filter. Substantially simultaneously with this degradation, the background luminance is supplemented by an external light source. In the preferred embodiment this supplemental luminance is reflected off the front of the graduated neutral density filter. This maintains the background luminance at the proper level so that the degradation has the net effect of decreasing the contrast only, not the overall task luminance. The visual task, or an identical visual task sample, is then viewed under sphere illumination. The image of the task under sphere illumination remains under an identical degraded condition. The level of sphere illumination is adjusted to the point of threshhold visibility. An illumination reading is taken of the sphere illumination in order to determine its magnitude. The illumination level determined by this reading is that sphere illumination which is equivalent (in terms of its contrast rendering ability) to the illumination provided by the lighting environment—hence is the Equivalent Sphere Illumination or ESI.

This last method, while simplifying considerably the number of steps involved in determining ESI, requires a skilled operator in order to obtain consistent results. That is, the person making the visual comparisons and determining under what conditions of contrast degradation the visibility of the task is effectively extinguished needs considerable experience with the machine. Without such experience, brightness rather than visibility tends to be the determining criterion. Clearly the necessity for a skilled operator has limited the dissemination of the method and apparatus disclosed in these two patents. Also, since the operator must be a skilled operator, it cannot be said that the operator was a "typical"

observer such as would be utilizing the lighting environment being evaluated. Hence, even if skilled operators are able to obtain consistent results, these results would not necessarily correspond to "typical observer" data.

Another system unlike the above instrument disclosed in the above cited patents, utilizes a pair of generally transparent cylinders placed over an ordinary footcandle meter. These cylinders include partially opaque portions which transmit light with varying degrees in order to simulate the effectiveness of light, arriving from various angular zones from the lighting environment, in producing Equivalent Sphere Illumination footcandles. Details of this instrument are set forth in the Journal of the Illuminating Engineering Society, Vol. 7, No. 3, April 1978, P. 183.

Contrasting with the above systems for evaluating an existing lighting environment, there also exist systems for predicting the Equivalent Sphere Illumination as well as other parameters such as contrast rendition factor (CRF) of yet to be realized lighting environments. One such system constructs a mathematical model of the lighting environment, taking into cosideration the effect of the room size and shape, surface reflectivity of the room itself, the characteristics of the lighting system in question as well as the parameters associated with the task observer, such as location, line of sight, viewing angle, the nature of the visual task, as well as body shadow effects. The first portion of this predictive technique requires a sophisticated computational method which discretizes various luminous and reflecting portions of the room, reducing the illumination therefrom to discretized and quantitized candle power figures. Once so described, the luminance of the task and background (and hence ESI) can be predicted by applying gonio-reflectance factors to these illumination calculations. The gonio-reflectance factors to these illumination calculations. The gonio-reflectance factors describe the response of standard visual tasks as a function of light received from various directions or zones of the environment surrounding the task. These gonio-reflectance factors have been determined through experimental techniques. This data is available in tabulated form and is expressed in luminance factors as a function of degrees of zenith and degrees in azimuth of the particular ray or rays of light emanating from a zone of the lighting environment and illuminating the task location for particular standardized observer positions. This method is detailed in RQQ Report #5; Journal of the Illuminating Engineering Society, January 1973, pp. 149–166.

BRIEF SUMMARY OF THE INVENTION

It is an object of the present invention to provide a system which permits one to evaluate an existing lighting environment, in a zone by zone manner, and without the cumbersomensss, inaccuracies and inconsistancies which typify prior art systems.

In this regard, it is a further object of this invention to provide a method and apparatus which eliminates any subjective evaluation of a visual task in the lighting environment in order to assess the quality of light provided thereby, yet can evaluate this quality of light in terms of any one or a number of standard visual tasks.

The present invention provides a mehtod and apparatus for assessing the quality of illumination from a lighting environment incident at a task location within said lighting environment, especially in terms of the ability of said lighting environment to render contract of a standard visual task at the task location. This apparatus includes a means for dividing the lighting environment into a plurality of discrete, substantially non-overlapping zones and a means for generating a plurality of electrical signals. Each of these electrical signals correspond to the luminous flux incident on said task location emanating from a selected zone of said plurality of zones. These signals, when associated with the position of the zones, accurately describes the luminous flux distribution of said lighting environment at the task location. This apparatus further includes electronic means for manipulating these signals so as to decribe this quality of illumination in terms of Equivalent Sphere Illumination and Contrast Rendition Factors.

BRIEF DESCRIPTION OF THE DRAWINGS

FIG. 1 shows an overall view of the preferred embodiment of the ESI meter in accordance with the instant invention.

FIG. 2 shows a detailed view of the internal construction of a portion of the meter of FIG. 1.

FIG. 3 shows a cross sectional view of the illumination sensing portion of the device of FIG. 2.

FIG. 4 shows an example of the ESI meter in a lighting environment.

FIG. 5 shows a cross section view of the ESI meter shown in FIG. 4.

DETAILED DESCRIPTION OF THE INVENTION

With reference to the drawings in which identical structures are identified by the same numerals throughout the figures, FIG. 1 shows a preferred embodiment of the Equivalent Sphere Illumination meter 2 (hereinafter referred to as the ESI meter). The heart of the meter is the illuminance head 10 which in its operative condition has an outside appearance defined by a substantially hemispherical cover 14 rotatably mounted on positionable base member 12. Cover 14 is preferably painted black inside to minimize any reflection within cover 14 and thus reduce stray light that might reach light sensitive element 24 contained therein. This cover 14 is generally featureless except for a vertical segment aperature 16 extending from the periphery thereof upwardly to the polar axis P. Aperture 16 will be explained in greater detail with reference to other portions of the illuminance head 10.

Positioned behind segment aperture 16 is a light tube 18 containing a photosensitive element for sensing the luminous flux from the lighting environment under investigation. At the end of light tube 18 is positioned aperture plate 20. Aperture plate 20 includes an aperture having specific dimensions. The light tube 18 together with its aperture plate is mounted for vertically pivotal movement along the direction of and in the same position as segment aperature 16. These three elements (segment aperture 16, light tube 18 and aperture plate 20) functionally cooperate to permit direct and precise analysis of the flux distribution emanating from the lighting environment onto the task position in order to permit an assessment of the quality of light provided by that lighting environment. Illuminous head 10 is electrically interconnected to the rest of the ESI meter by cable 36. Cable 36 is electrically connected to interface electronics 3 which in the preferred embodiment not only includes an analog to digital converter for converting to digital form the output electrical signals generated by the illuminance head 10, but additionally includes electronics to sense the position of the light tube 18 as well a power source to advance the light tube 18 in a sequential fashion to various positions during its luminous flux sampling operation. General purpose digital computer 6 is preferably a microprocessor which has the capability of performing various mathematical operations on the digital signals derived from interface electronics 3. Microprocesser 6 also has the capability of commanding interface 3 to position the light tube 18 of the illuminance head 10 in various predetermined positions. Associated with microprocessor 6 is input terminal 8 which is preferably a keyboard to input various parameters to control the microprocessor functions. Electronic memory 4 is capable of storing arrays of tabulated data. In the preferred embodiment, storage 4 contains gonio-reflectance factors for one or a plurality of standard visual tasks as well as formulas and other correction factors for mathmatically manipulating the digitalized output of the illuminance head 10 in order to aid in the analysis of the quality of the illumination provided by the lighting environment under investigation. Output interface 9 could take many forms, such as a printer, LED display, CRT display or other graphical medium.

FIG. 2 shows luminance head 10 with the hemispherical cover 14 and the cover to the base member 12 removed to show details of the mechanics of the illuminance head. Light tube 18 with its aperture plate 20 positioned in the end thereof is shown in perspective. The central light axis L of light tube 18 is shown forming angle $A_1$ (angle from zenith or zenith angle) relative to polar axis P. Angle $A_1$ is altered in a step-wise fashion by zenith stepper motor 28 and its associated gear train 28' which turn light tube 18 and its associated parts about horizontal axis H via photocell mount 22 positioned thereon. Also shown in FIG. 2 is preamplifier 23 which amplifies the relatively weak electrical signal from the photosensitive element contained in light tube 18. This amplified signal is transmitted to the rest of the ESI meter electronics via cable 36.

The above recited assembly is mounted for a rotation about the polar axis P on rotatable support plate 38. Base 12 contains azimuth stepper motor 30 and its associated gear train 30' which operates to rotate support plate 38 and the apparatus supported thereon about polar axis P. Both motors 28 and 30 are electrical motors of a known type. These motors, in response to an electric signal, rotate the associated equipment by precise increments.

Generally, it is necessary that the position of light tube 18, as to both zenith angle and azimuth angle, be known to the other peripheral electronic portions at the ESI meter. Applicant has found that this is easily done by providing, in the case of the azimuthal movement of light tube 18, a microswitch 34 and cam surface (positioned on the lower surface of 38 but not shown). This senses electronically at least one predetermined position of the plurality of sequential azimuthal positions. In like manner, microswitch 32 and associated cam surface 35 is used to electronically sense at least one position of the plurality of zenith angles which light tube 18 is capable of being positioned by stepper motor 28 and associated gear train 28'. This position sensing function could also be accomplished by a brush and commutator system.

Thus it can be seen that the structural arrangement schematically shown in FIG. 2 is capable of orienting a light tube 18 and its associated photosensitive element in any one of a plurality of angular positions. In the preferred embodiment these various angular positions are accomplished in a series of discrete step-wise movements to take full advantage of the precise positioning abilities of the stepper motors 28 and 30 and for other reasons as will become shortly apparent.

The cross section III—III of light tube 18 and its associated parts is shown in FIG. 3. Tube 18 is, essentially, 2 hollow opaque tube having positioned therein aperture plate 20. Fastened to one end thereof is a photocell mount 22 with a photocell 24 positioned so that its light sensitive element faces aperture plate 20. All internal surfaces are painted flat black to reduce or eliminate as much as possible any internal light reflections and thus reduce the tendency of any stray light from reaching photocell 24. Horizontal axis mounting hole 26 passes through photocell mount 22. Mounting hole 26 is normally positioned along horizontal axis H, about which axis light tube 18 and its associated structure is rotated via stepper motor 28 and its associated apparatus. In the preferred embodiment photocell 24 is a photovoltiac cell of the silicon photocell type. As the instrument is intended to evalute the quality of light as it illuminates a visual task, a silicon photocell is color corrected in a known manner to simulate the response of the human eye to the lighting environment.

The distance R from horizontal mounting hole 26 to aperture plate 20 is, for reasons that will be set forth, substantially equal to the inner radius of the cover 14 or about 4 inches (10.16 cm). The vertical dimension of the aperture in the aperture plate 20 defines the vertical angle of acceptance of photocell 24. For reasons that will become apparent when the operation of the overall apparatus is explained, the angle defined by vertical dimension, as measured from the axis of horizontal mounting hole 26, is substantially equal to each incremental agular displacement caused by stepper motor 28 and its associated apparatus 28'.

The horizontal dimension of the aperture and aperture plate 20 is preferably equal to or greater than the vertical dimension V. This dimension however is less critical since, as can be seen from FIG. 1, the horizontal dimension of the effective aperture viewed by the photocell 24 is defined by the width of a segment aperture 16 at the particular zenith angle occupied by light tube 18.

The operation of illuminance head 10 and its associated peripheral electronics will now be set forth. Hemispherical cover 14 is positioned on rotatable support plate 38 so that the segment aperture 16 aligns with the aperture plate 20. This alignment will be maintained throughout the operation of the illuminance head 10 since hemispherical cover 14 will move about polar axis P with the azimuthal movement of light tube 18. Segment aperture 16 provides a light penetratable aperture for any zenith angle of light tube 18. The illuminance head 10 is placed in a selected position in the lighting environment to be evaluated. This position, called the task position, could be for example on a desk top where a piece of written material would normally be positioned and viewed by a person seated at that desk. It is to be understood of course that the term "task position" could apply to any position in the lighting environment which the illumination engineer or scientist wishes to analyze in terms of the luminous flux distribution provided by the lighting environment. The peripheral electronic equipment is attached to illuminance head 10 by cable 36. While cable 36 may be long enough to position the peripheral electronics completely outside the luminous environment under investigation, this is usually not necessary since cable 36 can be made at least long enough to minimize any effect that the existence of the equipment and its operator may have on the illuminous flux at the task position. Also, while the peripheral electronics can take many forms, it is preferably made as compact as possible using known solid-state electronics techniques. The present preferred embodiment utilizes a Hewlett-Packard 6940B multi-programmer with a companion input terminal and printer. The electronic interface 3 as stated previously, not only converts the analogue signal output of the first stage amplifier 23 to a digitalized form, but receives positional information from microswitches 32 and 34 as well as controls the operation of stepper motors 28 and 30. The particular construction of the interface module 3 has not been set forth in detail since once disclosed, the structure thereof is readily ascertainable to one of ordinary skill in the art.

With the illuminance head 10 in position the operator commands the zenith stepper motor 28 and azimuth stepper motor 30 via the input terminal 8, to sequence through varicus positions until microswitches 32 and 34 signal to the stepper motor control portion of interface 3 (hence microprocessor 6) that a predetermined position had been reached. Once the position of light tube 18 is "zeroed" with the segment aperture 16 and light tube 18 oriented to a pre-determined position, the ESI meter is given the command to begin measuring the luminous flux. In the preferred embodiment this measuring begins from the "zeroed" position at the polar axis P (actually at a position where $A_1$ equals 0° zenith, for reasons as will be set forth below) and the arbitrarily chosen 0° azimuth. The zenith stepper motor 28 is caused to position light tube 18 in a series of sequential positions at each azimuthal direction before the azimuth stepper motor is caused to rotate support plate 38 and its attached cover 14 etc. to the next azimuthal position. Repositioned in a new azimuthal direction, zenith stepper motor causes light tube 18 to progress up towards polar axis P thus retracing the series of zenith positions in the new azimuthal position. This sequence is continued until each zone of the lighting environment has been covered by one of the series of sequential positions of light tube 18.

It would be most helpful to understand the significance of the particular arrangement of light tube 18 aperture plate 20 and their relation to segment aperture 16. It can be seen from the figures that as light tube 18 moves up and down in various zenith positions the width of the effective optical aperture as defined by the upper and lower portions of aperture plate 20 and the sides of segment aperture 16 changes. In the preferred embodiment dimension V (the vertical dimension of the aperture and aperture plate 20) amounts to 5° of difference in zenith angle at the radius R. In order to sample the luminous flux from all angles of zenith stepper motor 28 operates to position light tube 18 every 5°. As stated previously, this sequencial positioning starts at 0° angle of zenith, and progresses every 5° down to 85° angle of zenith in 5° increments. Thus a total of 18 readings is made at every azimuthal position of segment aperture 16. In so doing, the zones of the lighting environment which are measured at the individual zenith positions of light tube 18 are substantially non-overlapping. That is to say, virtually no portion of the lighting environment is sampled more than once by the traversal of the light tube along its vertical angular paths.

In like manner azimuth stepper motor 30 incrementally positions the hemispherical cover and its contained electromechanical equipment in equal sequential steps. These angular steps are equal to the angular width of the segment aperture 16 which is equal to 5°. Hence in its full cycle, the azimuth stepper motor causes the illuminance head to assume 72 sequential azimuthal positions. The significance of the particular shape of the segment aperature 16 becomes apparent. As stated before, it is a requirement for accurate assessment of the luminous flux density emanating from each zone of the environment that each such zone be sampled only once during these series of sequential measurements. Hence it is necessary to occlude or reduce the dimension of acceptance angle of the photocell 24 positioned within light tube 18 in such a manner that no portion or zone of the lighting environment is sampled more than once and substantially all zones of the lighting environment are included in the measuring sequence. This is accomplished by the shape of segment aperture 16 which assures that the azimuthal angle of acceptance is a constant 5° regardless of the zenith angle at which light tube 18 is positioned. This shape would be defined by the intersection of a sphere and two planes, both of these planes intersecting at a line along the polar axis P. The angle defined between these two planes is, in the preferred embodiment, 5°.

FIGS. 4 and 5 illustrate the operation of the preferred embodiment. Illuminance head 10 is shown positioned at a task location in a highly simplified lighting environment E. The task location is a desk top, specifically the location of printed or written matter typically viewed by the occupant of the chair. For simplicity the peripheral electronics making up the rest of ESI meter are not shown. These could be positioned any where convenient such as completely outside the environment E. Environment E is shown as including sources of direct light, such as a lighting system which includes suspended luminaire 40 and sunlit window 42. Also shown in reflective ceiling 44, walls 46 and floor 48, each of which contribute, directly or indirectly, to lighting at the task location, and hence to the visibility of any task thereat.

Three zones, $Z_1$, $Z_2$ and $Z_3$ are shown as examples of the zone by zone assessment of environment E which the system in accordance with the instant invention is capable of performing. For simplicity, these zones are all in the same azimuthal direction. For purposes of this example and consistant with Applicant's preferred example, all zones are 5° in the azimuthal direction (whatever the zenith angle) and 5° in the zenith direction. Zone $1_1$ is shown including a portion of the ceiling 42 which is intensely lit by luminaire 40 and lit partially by window 42 and interreflected light from other portions of E. All other portions of the lighting environment are obscured by the aperture plate 20 and the sides of the segment aperture 16. The light reflected from that portion of the ceiling in zone $Z_1$, whatever the original source of that light, causes photocell 24 to generate an electrical signal proportional to the luminous flux incident on the photocell (and thus on the task location) emanating from zone $Z_1$. Of course, the proximity of luminaire 40 to the zone $Z_3$ (containing a portion of luminaire 40) may send some light into light tube 18 directly. Clearly such light is not part of the luminous flux from Z, and conceivably this light could eventually impact on photocell $Z_4$. But the flat black antireflective coating reduces the effect of this extraneous light.

Zone $z_2$ is shown to include a portion of the wall 46 and a portion of window 42. Zone $Z_2$ has a zenith angle greater than $Z_1$, but because of the operation of segment aperture 16 and aperture plate 20, has the same spherical coordinate dimensions (5°×5°) as $Z_1$ and for that matter, all the zones assessed by the preferred embodiment. The luminous flux emanating from zone $Z_2$ and impinging on photocell 24 has as its major source the window 42. The upper portion of zone $Z_2$ which encompasses a portion of wall 42 clearly contributes a minor portion of the luminous flux from that zone. The light tube 18 and its associated plate 20 together with photocell 24 average the contributions of these two distinct sources of light, the photocell thus generating a signal corresponding to this average flux. Once again; the proximity of the rest of the brightly lighted window 42 to zone $Z_2$ may contribute some extraneous light, but this effect is minimized by using light absorbing coatings on the internal surfaces of the light tube, aperture plate, etc.

Zone $Z_3$ is shown as embracing a portion of the luminous environment immediately adjacent zone $Z_1$. Zone $Z_3$ includes a portion of luminaire, and hence probably illuminates the task location to a greater extent than does either the window 42 or walls 46. However this does not mean that the signal generated by photocell 24 when illuminated by zone $Z_3$ is greater than the signal corresponding to either of zones $Z_1$ and $Z_2$. Clearly the size of the optical aperture formed by the aperture plate 20 and sides of segment aperture 16 is considerably less than the size of the optical aperture formed by these parts when zones $Z_1$ and $Z_2$ are measured. This reduction in aperture size would have the effect of reducing the light and hence the signal generated. Nor does the relative magnitudes of the signals corresponding to zones $Z_1$, $Z_2$ and $Z_3$ necessarily directly correspond to the contribution each would make to the visibility of a visual task at the task location. Indeed, it is quite possible for light emanating from zone $Z_3$ for example to generate veiling reflections as explained earlier. In which case, the gonio-reflectance factors corresponding to zone $Z_3$ would, when combined electronically with the signal corresponding thereto, derate or reduce the effective contribution of zone $Z_3$ to the contrast between the task and the background of the visual task represented by the gonio-reflectance factors in the memory of the ESI meter. This last mentioned step will be set forth below in terms of array manipulation.

It should be noted that the teaching of the present invention should not be limited to the preferred 5° constant angle of acceptance in terms of the spherical coordinates. Clearly any system which can measure the luminous flux emanating from the luminous environment and impinging of the task location and can accurately correlate the the luminous flux measured with the position of that zone can be used to evaluate the quality of light provided by that luminous evironment. The choice of a 5°×5° zones provides many that dividing up the liminous environment into 5°×5° zones results in a number of samplings which is large enough to accurately represent the illuminous flux density of the luminous environment, but at the same time can be successfully assessed in a reasonable time using the present apparatus. Clearly, a system which divides the lighting environment into say, 1°×1° zones or further yet 1 minute by 1 minute zones, could permit one to more precisely analyze the flux density measured thereby, but this extra accuracy is not required in the real world and the increased time and processing equipment necessary to handle this volume of data can be burdensome. Secondly, but perhaps more important, is the fact that certain standard visual tasks have been analyzed in terms of the reflectance factors of that visual task (both in terms of task background and task itself) for a particular viewing position. These reflectance factors have been correlated with the light arriving in particular directions, resulting in a set of gonio-reflectance factors as mentioned supra in relation to predictive techniques. In particular, gonio-reflectance factors are readily available standards in the industry and are expressed in terms of 5° increments. Hence, it is most advantageous to generate an array of luminous flux measurements which can be correlated on a one to one basis with the available gonio-reflectance factors for certain standard visual tasks.

It is possible for a worker in this art to directly assess a print-out of the magnitude of luminous flux properly correlated with various directions of the zones these luminous flux measurements represent. However there are certain more convenient forms of expressing the quality of illumination. The use of the gonio-reflectance factors permit the reduction of the array luminous flux measurement to easily handled comparitive quantities such as Equivalent Sphere Illumination, Contrast Rendition Factor, etc.; all of which are notorious comparitive standards in the illumination industry.

From the above discussion it can be seen that the illuminance head 10 in its sequential operation operates to generate a plurality of electrical signals. Each of these signals would correspond, depending on the calibration of the cell, first stage amplifier, etc. with the luminous flux emanating from a particular zone of the lighting environment and impinging on the task location. The illuminance head 10 defines these zones in such a manner that the luminous flux density of the luminous environment, as measured from the task location, is accurately assessed. Once generated, this plurality of electrical signals can be manipulated in various ways by the peripheral electronics to derive useful numbers which can be used in assessing the quality of the illumination provided by the lighting environment. In simple terms, preferred embodiment generates an array of digitalized quantities, the array having dimensions of 72×18. Since the illuminance head generates these numbers in a known and repeatable sequence and since it begins the measurement operation from a known position, the positional relation between the zones sampled and the digitalized quantities are known. The total illumination provided by the lighting environment is found by subjecting these quantities to cosine correction factors as a function the zenith of the zone corresponding to the quantity being manipulated, and summing the corrected quantities. The factors and manipulative steps can be entered via input terminal 8 and stored in memory 4. Also contained in the memory 4 of peripheral electronics is the gonio-reflectance factors for one or a plurality of standard visual tasks. These gonio-reflectance factors are inputted in an equivalent arrays having 37×18 dimensions and equivalent positional relationships (i.e., each gonio-reflectance factor corresponding to the same zone in which the corresponding luminous flux measurement was made). This array has only a dimension of 37, rather than 72, since the reflective characteristics of the task and background have the property of being symmetrical about the plane passing through the observer position, the task, and the polar axis P. By known mathematical manipulations the flux measurments and the gonio-reflectance factors are combined in order to obtain the luminance of the background of the task, the luminance of the task itself, and the contrast of the task. This contrast can be adjusted using a relative contrast sensitivity curve, together with the known contrast of the standard task in a sphere lighting environment, to obtain the contrast rendition factor from this. The Equivalent Sphere Illumination can also be calculated. These calculations can be made with or without body shadow effects.

The benefits of the disclosed Equivalent Sphere Illumination meter are manifold and can only be briefly assessed at this point. Clearly, the above system eliminates the subjective aspects of certain prior art methods which require direct visual comparison of a task positioned in the environment with the task under sphere illumination. It eliminates variations inherent in the use of actual samples of the so-called "standard visual task". Also, because of the electronic nature of the manipulation, several standard visual tasks can be electronically substituted for one another by applying their gonio-reflectance factors to the same flux density measurements provided by the illuminance head 10. In this way, the appropriateness of a particular task location for performance of various tasks can be analyzed quickly and easily. Also should the user require, specialized visual tasks can be electronically created and compared directly with the results obtained in analyzing the quality of illumination using standard known visual task data.

It should be understood, of course, that the full scope of the invention is defined by the appended claims and not by the preferred embodiment disclosed herein. For example, it is possible to construct a illuminous flux density analyzing apparatus using a plurality of non-moving fixed photosensitive elements each of which would assess a pre-determined non-overlapping zone of the luminous environment. While such a system is feasible, problems with calibration make the presently disclosed system the preferred system.

I claim:

1. An apparatus for directly assessing the quality of illumination from a lighting environment incident at a task location within said lighting environment, especially in terms of the ability of said illumination to render contrast of a standard visual task at said task location, comprising means for dividing said lighting environment into a plurality of discrete, substantially non-overlapping zones and means for generating a plurality of electrical signals, each of said signals corresponding to the luminous flux incident on said task location emanating from a selected zone of said plurality of zones, such that said plurality of said electrical signals, when positionally associated with said plurality of zones, accurately describes the luminous flux distribution of said lighting environment at said task location.

2. The apparatus in accordance with claim 1 wherein said means for generating said plurality of electrical signals includes a photosensitive element and means for sequentially positioning said photosensitive element so as to permit said luminous flux from each zone of said plurality of zones to sequentially impinge on said photosensitive element.

3. An apparatus as set forth in claim 2 wherein said means for sequentially positioning said photosensitive element includes means for electrically indicating the position of at least one of a said zones during the operation of said apparatus.

4. An apparatus as set forth in claim 2 wherein said means for sequentially positioning said photosensitive element includes means for positioning said photosensitive element so as to sample a plurality of zones at a particular predetermined azimuthal position, said last mentioned means further operating to change the position of said photosensitive element by an increment of azimuth whereby a further series of readings are taken at the new azimuthal position.

5. The apparatus according to claim 1 wherein the shape of said zones are defined by increments of azimuth angle and increments of zenith angle in a spherical coordinate system arranged about said task location.

6. An apparatus in accordance with claim 5 wherein said increments of azimuth angle describing each said zone are constant.

7. An apparatus as described in claim 6 wherein said increments of zenith angle describing each said zone are constant.

8. An apparatus set forth in claim 7 wherein said increments of azimuth angle and said increments of zenith angle describing each said zone are substantially equal.

9. An apparatus in accordance with claim 6 wherein said increments of azimuth angle and said increments of zenith angle are both 5° and wherein said plurality of electrical signals corresponding to said plurality of zones can be arranged in an array of $17 \times 72$ flux readings.

10. An apparatus in accordance with claim 1 further including means for electrically manipulating said plurality of electrical signals in order to calculate the Equivalent Sphere Illumination provided by said lighting environment at said task position.

11. An apparatus in accordance with claim 10 wherein said means for electrically manipulating said signals includes means for storing predetermined gonio-reflectance factors for a standard visual task, each of said gonio-reflectance factors having been determined for a light source positioned in each of said zones, said apparatus further including means for electrically generating the product of each of said electrical signals and the corresponding gonio-reflectance factors and for summing said products to determine the illuminance of the task and the illuminance of the background of said standard task.

12. A method for directly assessing the quality of illumination at a task location in a lighting environment, especially in terms of its ability to the render contrast of a standard visual task at said task position, comprising: dividing the lighting environment into a plurality of substantially non-overlapping, discrete zones; generating a plurality of electrical signals, each of said signals corresponding to the luminous flux emanating from a zone of said plurality of zones and impinging on said task location: and, positionally relating said signals to each corresponding zone, such that said plurality of signals accurately represents the flux distribution of said lighting environment at said task location.

13. A method as set forth in claim 12 wherein said generating said plurality of signals includes sequentially positioning a photosensitive element so that the luminous flux from a particular zone of said plurality of zones impinges on said photosensitive element; and sensing the electrical output of said photosensitive element thus impinged by the luminous flux from said particular zone.

14. A method as set forth in claim 12 further including a step of combining the plurality of electrical signals in such a manner as to determine the total illumination at said task location provided by said lighting environment.

15. A method as set forth in claim 12 further including storing a second plurality of signals and third plurality of signals, said second plurality of signals corresponding to the gonio-reflectance factors for the background of a standard visual task, said third plurality of signals corresponding to the gonio-reflectance factors for the task of said standard visual task; said method further including a step of electronically combining said first plurality of signals with said second plurality of signals and with said third plurality of signals in order to generate an electrical signal corresponding to the luminance of the background of said standard visual task positioned at said task location and an electrical signal corresponding to the luminance of said task of said standard visual task at said task location.

16. A method as set forth in claim 15 further including a step of determining: the contrast of said standard task at said task location; the contrast rendition factor; the light effectiveness factor; and, the equivalent sphere illumination associated with said illumination at said task location.

* * * * *

UNITED STATES PATENT AND TRADEMARK OFFICE
CERTIFICATE OF CORRECTION

PATENT NO. : 4,320,969
DATED : March 23, 1982
INVENTOR(S) : John D. Green

It is certified that error appears in the above—identified patent and that said Letters Patent is hereby corrected as shown below:

Column 1, line 9, after "render" insert --the-- after "contrast to a" should read --of the--

Column 3, lines 37 and 38, delete "The gonio-reflectance factors to these illumination calculations."

Column 4, line 1, "contract" should read -- contrast--

Column 9, line 57, after "many" insert -- benefits, however, to the overall systems. First, it has been found--

Signed and Sealed this

Thirty-first Day of August 1982

[SEAL]

Attest:

GERALD J. MOSSINGHOFF

Attesting Officer    Commissioner of Patents and Trademarks